E. B. MAXTED.
PROCESS AND APPARATUS FOR THE HYDROGENATION OF OILS, FATS, AND LIKE MATERIALS.
APPLICATION FILED JUNE 22, 1918.
1,313,407.
Patented Aug. 19, 1919.
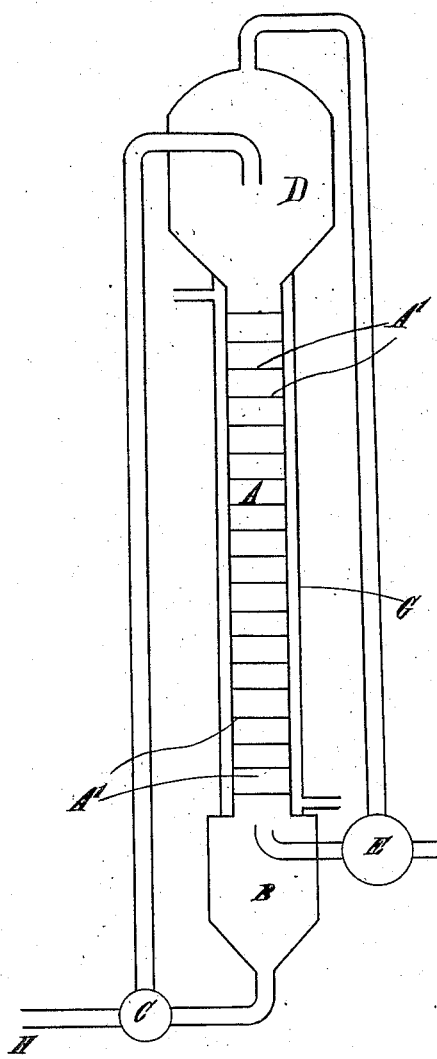
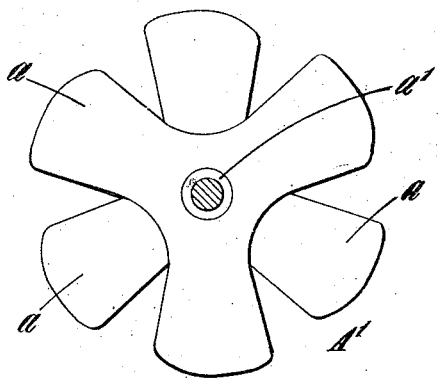
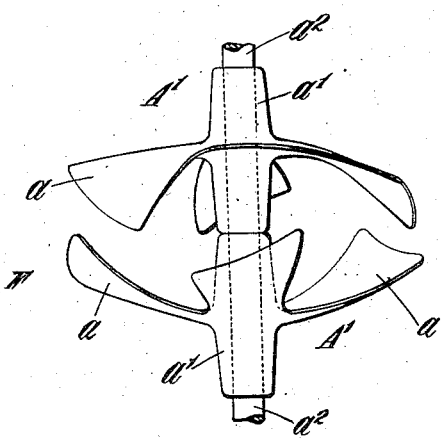
Inventor
Edward B. Maxted
By Vernon Goldsborough & O'Neill
Attys.

UNITED STATES PATENT OFFICE.

EDWARD BRADFORD MAXTED, OF WALSALL, ENGLAND.

PROCESS AND APPARATUS FOR THE HYDROGENATION OF OILS, FATS, AND LIKE MATERIALS.

1,313,407.     Specification of Letters Patent.     Patented Aug. 19, 1919.

Application filed June 22, 1918. Serial No. 241,435.

*To all whom it may concern:*

Be it known that I, EDWARD BRADFORD MAXTED, a subject of the King of Great Britain, residing at 63 Highgate road, Walsall, in the county of Stafford, England, have invented certain new and useful Improvements in Processes and Apparatus for the Hydrogenation of Oils, Fats, and like Materials, of which the following is a specification.

In carrying out the catalytic hydrogenation of unsaturated oils, fats and like materials, on a commercial scale, where rapidity of working is an essential factor, it is very desirable, firstly, that as intimate contact as possible be obtained between the liquid and gaseous phases of the system, and secondly that the portion of the oil in which the state of intimate contact exists should be as large a fraction of the whole bulk of the oil as is practicable. This invention relates to an apparatus and method of working in which practically the whole of the oil or fat under treatment (and containing a finely divided catalyst) is brought into a state of intimate contact with hydrogen. In consequence of this, the hydrogenation reaction proceeds with a far higher velocity than is possible in apparatus of the usual type in which the region of intimate contact does not nearly include the whole bulk of the oil. According to this invention the oil and gas are driven through a mixing column, in which the oil and gas mixture is caused, by the action of fixed propeller-like baffle plates, to be rotated alternately in opposite directions, so as to bring about intimate contact between the gas and oil throughout the length of the column.

In order that the said invention may be clearly understood and readily carried into effect the same will now be described more fully with reference to the accompanying drawings, in which:—

Figure 1 is a diagram of an apparatus embodying this invention; and

Figs. 2 and 3 show perspectively in plan and side elevation a typical form of baffle for use in the column of the apparatus.

A is a tall hydrogenation vessel or column, which may conveniently be cylindrical in cross section, provided throughout its length with stationary propeller-like bladed horizontal baffles A' the blades $a$ of which are so curved that the liquid-gas mixture, projected through the column A by the pumps E and C is, on striking the baffles A', alternately rotated clockwise and anti-clockwise respectively by the alternate baffle plates. The number of blades $a$ to each baffle plate will vary with the size of the plant. The directing blades of the successive baffle plates should not be vertically above one another; however, those of pairs of baffle plates separated from one another by one or more intervening baffle plates may be. The inclination of the baffle plates may advantageously be such that they exert, in addition to the rotating influence referred to above, such an action on the hydrogen oil mixture that this is alternately thrown toward the center of the column and toward its periphery. As shown in Fig. 3 the blades, which form alternate right and left handed screws of propeller shape, are inclined to form baffles having a shallow conical or cupped outline, the cones alternating in direction to give the desired inward and outward movement to the mixture. This avoids any danger of the centrifugal action causing the liquid to be thrown to the periphery and the gas to pass up the center of the column. The baffles are provided with the central bosses $a'$ which are mounted on a central supporting rod $a^2$ and space the baffles apart.

Below the column A is a chamber B communicating with a pump C by means of which the oil, with which the column A and chamber B are filled, can be withdrawn from the bottom of the chamber B are caused to flow into the top part of the column A. D is an enlarged head of the column A, of sufficient size to accommodate easily the increased bulk of liquid, or mixture, produced when hydrogen is passed through the column. This passage of hydrogen is effected by means of the pump E which withdraws gas from the head D and delivers it at the bottom of the column A at such a rate that the whole of the oil in the column, under the influence of the special baffles referred to above, is brought into a state of fine division and intimate mixture with the hydrogen and is in a form approximating to a froth.

Fresh hydrogen to take the place of that absorbed by the oil is introduced by means of a supply pipe shown at F or in any other convenient way, the emptying and filling of the vessel with oil and the catalyst being effected, for instance, by means of the branch pipe H. The hydrogenation reaction may with advantage be carried out at pressure higher than atmospheric.

The heating of the charge to the temperature required is effected by means of superheated steam or flue-gases in the heating jacket shown at G, or in any other convenient manner.

What I claim and desire to secure by Letters Patent of the United States is:—

1. A process for the catalytic hydrogenation of unsaturated oils, fats and like materials, which consists in passing hydrogen through the liquid under treatment in a column and in causing the liquid-gas mixture as it is projected through the column to be partially rotated alternately in opposite directions through an angle, and alternately toward and from the periphery during the absorption of the hydrogen.

2. Apparatus for the catalytic hydrogenation of unsaturated oils, fats and like materials, comprising a vertical column, a chamber at the base of the column through which liquid and hydrogen are adapted to be fed, an enlarged head to the column, means for withdrawing hydrogen from the head and delivering it to the base chamber, means for withdrawing liquid from the base chamber and delivering it to the head of the column, and a succession of superposed alternatingly acting baffles in the column, which baffles are provided with directing blades forming alternate right and left handed screws and inclined in opposite directions in alternate baffles so as to direct the liquid gas mixture alternately toward and away from the periphery of the column during the alternating clockwise and anti-clockwise angular movement due to the screw formation.

3. Apparatus for the catalytic hydrogenation of unsaturated oils, fats and like materials, comprising a vertical column, means for projecting through the said column the liquid under treatment and containing a catalyst, means for circulating hydrogen through the column from bottom to top and a succession of superposed alternatingly acting baffles in the column, which baffles are provided with directing blades forming alternate right and left handed screws and inclined in opposite directions in alternate baffles so as to direct the liquid-gas mixture alternately toward and away from the periphery of the column during the alternating clockwise and anti-clockwise angular movement due to the screw formation.

EDWARD BRADFORD MAXTED.